(12) United States Patent
Carter

(10) Patent No.: US 11,797,285 B2
(45) Date of Patent: Oct. 24, 2023

(54) SYSTEMS AND/OR METHODS FOR FACILITATING SOFTWARE-BASED DEPLOYMENTS INTO POTENTIALLY COMPLEX HETEROGENEOUS COMPUTING ENVIRONMENTS

(71) Applicant: SOFTWARE AG, Darmstadt (DE)

(72) Inventor: John Carter, Paris (FR)

(73) Assignee: SOFTWARE AG, Darmstadt (DE)

( * ) Notice: Subject to any disclaimer, the term of this patent is extended or adjusted under 35 U.S.C. 154(b) by 87 days.

(21) Appl. No.: 17/536,784

(22) Filed: Nov. 29, 2021

(65) Prior Publication Data

US 2023/0168875 A1 Jun. 1, 2023

(51) Int. Cl.
  *G06F 9/445* (2018.01)
  *G06F 8/61* (2018.01)
  *H04L 41/0806* (2022.01)
  *H04L 67/00* (2022.01)

(52) U.S. Cl.
  CPC ............ *G06F 8/61* (2013.01); *H04L 41/0806* (2013.01); *H04L 67/34* (2013.01)

(58) Field of Classification Search
  CPC ........................................................ G06F 8/61
  USPC ......................................................... 717/174
  See application file for complete search history.

(56) References Cited

U.S. PATENT DOCUMENTS 8,281,300 B2 10/2012 Joy et al.
8,327,351 B2 12/2012 Paladino et al.
8,997,088 B2 3/2015 Gurikar et al.
10,810,027 B2 10/2020 Adler et al.
10,866,787 B2 12/2020 Bhalerao et al.
10,869,199 B2 * 12/2020 Raleigh ............... H04L 63/0853
(Continued)

FOREIGN PATENT DOCUMENTS

WO 2021/066953 4/2021

OTHER PUBLICATIONS

Jenkins—Build Great Things at any Scale, retrieved Jun. 27, 2022, 4 pages. https://www.jenkins.io/.
(Continued)

*Primary Examiner* — Evral E Bodden
(74) *Attorney, Agent, or Firm* — Nixon & Vanderhye PC

(57) ABSTRACT

Techniques enable an application for execution in a heterogeneous computing environment including an on-premise server and a Software-as-a-Service (SaaS) provider. A scaffold defining assets usable by the application and configuration details therefor is developed. At least one scaffold map is generated. Each specifies target servers where individual assets are located and/or to be located. Different scaffold maps are generated for different user-specifiable environments to which the application is deployable. An application manager helps generate agent manifests based on the scaffold and one or more scaffold maps. The agent manifests are usable to configure respective target servers. A package manager helps provision the target servers based on the agent manifests. The provisioning includes distributing to corresponding target servers, and processing thereon, the agent manifests. The processing includes rolling back the distribution responsive to an occurrence of a defined exception case. The application is enabled following successful provisioning.

20 Claims, 8 Drawing Sheets

(56) References Cited

U.S. PATENT DOCUMENTS

2017/0054790 A1* 2/2017 McCubbin .............. H04L 69/04

OTHER PUBLICATIONS

Atlassian—Our Solutions, Agile Tools for Agile Teams, retrieved Jun. 27, 2022, 3 pages. https://www.atlassian.com/.

Apache Maven—Apache Maven Project, Welcome to Apache Maven, retrieved Jun. 27, 2022, 2 pages. https://maven.apache.org/.

Apache Ant—The Apache Ant Project, Welcome, retrieved Jun. 27, 2022, 2 pages. https://ant.apache.org/.

RedHat—Linux package management with YUM and RPM, retrieved Jun. 27, 2022, 6 pages. https://www.redhat.com/sysadmin/how-manage-packages.

Hashicorp Terraform—What is Terraform, retrieved Jun. 27, 2022, 3 pages. https://www.terraform.io/intro.

Alpine Linux—Working with the Alpine Package Keeper (apk), retrieved Jun. 27, 2022, 4 pages. https://docs.alpinelinux.org/user-handbook/0.1a/Working/apk.html.

Ansible Documentation—Getting started with Ansible, retrieved Jun. 27, 2022, 2 pages. https://docs.ansible.com/ansible/latest/getting_started/index.html.

Microsoft—Use the winget tool to install and manage applications, retrieved Jun. 27, 2022, 4 pages. https://docs.microsoft.com/en-us/windows/package-manager/winget/.

PyPi—pip 22.1.2, Project description, retrieved Jun. 27, 2022, 2 pages. https://pypi.org/project/pip/.

Npm Docs—About npm, retrieved Jun. 27, 2022, 2 pages. https://docs.npmjs.com/about-npm.

Github—xmake-io/ xrepo, retrieved Jun. 27, 2022, 6 pages. https://github.com/xmake-io/xrepo.

Anaconda—Mamba 0.24.0, retrieved Jun. 27, 2022, 1 page. https://anaconda.org/conda-forge/mamba.

Conda—Conda documentation, retrieved Jun. 27, 2022, 1 page. https://docs.conda.io/en/latest/.

Ubuntu—Package Management, retrieved Jun. 27, 2022, 7 pages. https://ubuntu.com/server/docs/package-management.

PyPi—The Python Package Index, retrieved Jun. 27, 2022, 2 pages. https://pypi.org/.

AWS—CI/CD on AWS, retrieved Jun. 27, 2022, 2 pages. https://docs.aws.amazon.com/whitepapers/latest/cicd_for_5g_networks_on_aws/cicd-on-aws.html.

* cited by examiner

SYSTEMS AND/OR METHODS FOR FACILITATING SOFTWARE-BASED DEPLOYMENTS INTO POTENTIALLY COMPLEX HETEROGENEOUS COMPUTING ENVIRONMENTS

TECHNICAL FIELD

Certain example embodiments described herein relate to techniques for distributing software into computing environments. More particularly, certain example embodiments described herein relate to a combined application and package manager that facilitates deployments into potentially complex heterogeneous computing environments including on-premise and/or Software-as-a-Service (SaaS) architectures, and associated methods.

BACKGROUND AND SUMMARY

Computing technology has evolved rapidly in a short amount of time, e.g., with significant advancements in both standalone computer and computer network technologies. With regard to the latter, for example, there is continued technical innovation in client-server, distributed computing (including cloud computing), and other technology areas.

Recently, so-called "serverless" technology architectures have gained ground in developer circles. Serverless technology architectures allow technical systems to be built based around a topology of computer-implemented functions or services running across disparate technology platforms offered by different platform providers. One advantage to this serverless architecture approach is that developers do not necessarily need to concern themselves with managing the runtime infrastructure on which their computing solutions operate. For example, with a serverless technology architecture, an application will still run on servers, but the server management will be done elsewhere and by another party. Thus, the developer does not need to provision, scale, and maintain servers to run applications, databases, storage systems, and/or the other technical components of the computer-mediated solution being designed and implemented. The thought is that this architecture and approach can enable developers to focus on their core technology solutions (e.g., applications), rather than having to be concerned with the management of servers or runtimes, either in the cloud or on-premises.

Unfortunately, however, the so-called serverless technology approach oftentimes creates or furthers an already-present disconnect between the reality of providing the infrastructure, and deploying and maintaining the technology solution (e.g., the application). This presents technical challenges for both platform providers and developers. For a software and service provider, this disconnect can be particularly complex, especially when the provider offers both a software-as-a-service (SaaS) platform and on-premise installations that in turn hosts software written by a developer along with license/export restricted software. For the platform provider, technical difficulties can include issues surrounding how shared runtime components can be installed reliably and securely into a customer's private data center, and how to provide a heterogeneous control plane for both the SaaS runtime and customer's components running externally. From the developer perspective, deploying into a heterogeneous distributed computing environment (e.g., that includes a mix of SaaS and/or on-premise technologies) is complicated by the fact that there is no single common code base, nor is it necessarily apparent how to coordinate updates and manage the complex interdependencies between services, platforms, and providers. And it can be quite difficult to actually do that coordination. Mostly, this is managed either manually or requires custom bespoke development by the infrastructure architecture using tooling such as ansible, etc.

FIG. 1 is a block diagram providing a high-level overview of the tasks that developers and platform providers manage when leveraging serverless technology. Of course, this entire FIG. 1 approach, or a variant of it, may be repeated as different solutions are developed.

As shown in FIG. 1, a developer performs development-related tasks (102). These tasks include developing (104) and building (106) a solution, and these development-related tasks (102) may be performed iteratively. Tools such as Apache Maven (a software project management and comprehension tool), Apache Ant (a Java library and command-line tool that assists in the building of Java or non-Java applications), npm (a package manager for the Node JavaScript platform), and others oftentimes are used to assist with these processes. A developer also performs install-related tasks (108) related to installation (110) and configuration (112). Install-related tasks (108) may be aided by tools such as yum (a command-line package-management utility for computers running the Linux operating system using the RPM Package Manager), Alpine Package Keeper or apk (used to help manage software or other packages of a system), Ansible (a software provisioning, configuration management, and application-deployment tool enabling infrastructure as code), Terraform (oftentimes used for provisioning infrastructure across various cloud environments), and/or others.

As shown in FIG. 1, development-related tasks (102) and install-related tasks (108) feed into tasks for deployment (114), testing (116), and staging (118). Tools like Jenkins, Atlassian, AWS CD, GIT CI/CD, and others may assist with some or all of these tasks. Tooling, such as that provided by Jenkins and Atlassian, provides a means to deploy solutions. Unfortunately, it typically requires a significant amount of custom scripting. It also tends to be heavily dependent on the build and installation tools. That is, deployment-related tasks might be specific for Maven, Ant, Yum, Terraform, and/or other tools used elsewhere in the process. These other tools themselves often require complex configuration and scripting. The resulting solution is often only applicable for building for a particular platform and/or for a specific service/application.

Package managers provide developers with a means to share and leverage common features but are also only a subset of managing a complex deployment. They typically are targeted either as part of the build or installation tasks. In addition, they tend to be limited to open-source and unlicensed software.

Another complication relates to hybrid deployments that include SaaS architectures and on-premise technology. Some consider SaaS deployment technology immature in that it is either considered extremely difficult to automate, or proprietary in which case it may be impossible or impractical for such technologies to integrate with a hybrid deployment that requires synchronized deployment across these two technology spheres.

Certain example embodiments help address the above-described and/or other technical challenges. For example, certain example embodiments provide a technology platform that is reliable, simple, and broadly applicable for different types of services/integrations that also enables developers to easily deploy a complete solution (e.g., application) across multiple runtimes in a serverless architecture.

Certain example embodiments enlarge the concept of a package manager to help ensure that a coherent, working solution can be deployed across multiple runtimes, whether based on an on-premise, SaaS, or hybrid architecture, while respecting both export and licensing restrictions potentially imposed by software or other technology components. Certain example embodiments may work in tandem with tools such as Jenkins and AWS CD, e.g., to greatly reduce technical complexities associated with collating build, deployment, and configuration tasks used in application development.

In certain example embodiments, a method of enabling an application for execution in a heterogeneous computing environment is provided. The heterogeneous computing environment includes different runtime environments distributed across at least one on-premise server and at least one SaaS provider such that the at least one on-premise server is configured to provide at least one first service of the application and the at least one SaaS provider is configured to provide at least one second service of the application. A scaffold for the application is developed. The scaffold defines a set of assets usable by the application as well as configuration details for the assets. At least one scaffold map is generated, with each scaffold map specifying target servers in the heterogeneous computing environment where individual assets in the set of assets are located and/or where individual assets in the set of assets are to be located. Different scaffold maps are generated for different user-specifiable environments to which the application is deployable. Agent manifests are automatically and programmatically generated via an application manager, based on the scaffold and one or more of the at least one scaffold maps. The agent manifests are usable to configure respective target servers associated with the respective scaffold maps. The target servers of heterogeneous computing environment are automatically and programmatically provisioned via a package manager, based on the agent manifests. The provisioning includes distributing to corresponding target servers, and processing thereon, the agent manifests. The processing includes rolling back the distribution responsive to an occurrence of a defined exception case. The application is enabled following successful provisioning.

In certain example embodiments, application manager instances and package manager instances may be are deployable to different runtimes on different target servers. In this regard, in certain example embodiments, the application manager instances may be configured to assist in local scaffold creation, the package manager instances may be configured to assist in processing local package deployments for the application, etc.

In certain example embodiments, the method may be operable in one of first and second modes, the first mode employing the application manager and the package manger to centrally manage deployment and configuration of the application, and the second mode employing the application manager instances and the package manager instances to locally manage deployment and configuration of the application independent of the SaaS provider.

In certain example embodiments, different packages may be deployable to different target servers in the heterogeneous computing environment, e.g., with each package having one of a plurality of different types; and rules defining where different packages can be deployed in the heterogeneous computing environment may be deployed, e.g., based on the types of the respective packages. In this regard, in certain example embodiments, one of the types may indicate that the package(s) associated therewith are open source.

In certain example embodiments, sandboxing may be enabled on a level more granular than an individual runtime. For example, sandboxing may be practiced for individual packages and/or individual assets. In certain example embodiments, sandboxing may be practiced for a given package based on whether the given package was provided by a public repository.

In certain example embodiments, the method may be run in one of first and second modes, the first mode enabling hot deployment across platforms at a level more granular than an individual runtime and the second mode enabling cold deployment across platforms at the level more granular than an individual runtime.

In certain example embodiments, the scaffold may be developed based on user-specified information received via a user interface.

In certain example embodiments, each agent manifest may be associated with one target server.

In certain example embodiments, for a given target server, multiple agent manifests may be generated, e.g., provided that the given target server includes multiple different runtime platforms.

These techniques may be implemented in connection with at least one non-transitory computer readable storage medium comprising code that, when executed by at least one processor, perform corresponding operations to those described herein. Similarly, the techniques described herein may be implemented in connection with a system configured to enable an application to be executed in such a heterogeneous computing environment. At least one processor may aid in providing application manager and package manager functionality. For instance, they may be implemented as software modules, and the application manager software module and the package manager software module may run in the system. That system may be part of, or disconnected from, the at least one on-premise server. That system additionally or alternatively may be part of, or disconnected from, the SaaS platform. Additionally or alternatively, SaaS servers of the SaaS provider may be parts of the system.

It will be appreciated that in certain example embodiments, advantageously, packages are distributable to multiple different runtimes with respective configurations appropriate for the different respective runtimes, rather than being deployed to a container.

The features, aspects, advantages, and example embodiments described herein may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION

Certain example embodiments relate to a combined application and package manager that enables developers to easily build services (e.g., locally), and then deploy them across a potentially complex architecture that may include serverless SaaS providers and/or on-premise runtime components. Certain example embodiments are able to source the components from a collection of different source code repositories, e.g., as may be required by the customer and/or platform provider, which it is a technical improvement to the tooling itself.

In the discussion that follows, it should be borne in mind that an application or service typically can be thought of as a complete solution that traverses different servers, data centers, and SaaS hybrid components, e.g., in serving some overarching technical objective. A service also may be a bundle an executable logic that can be called as a part of an application or broader service. A package can be thought of as a working unit that comprises multiple components, configurations, and technologies, e.g., to provide a set of microservice endpoints and/or Application Programming Interfaces (APIs) installed into a single run-time environment. An application or service typically will comprise a number of different packages. A library typically represents a set of low-level functions developed in a particular language and for a specific runtime environment. A library does not necessarily make up a working unit absent required configuration/setup and dependencies also being present/installed. A library may be a sub-component of a package. A library can be considered anything with a .jar, .so., .dll, or other extension, for example.

Figure 1:
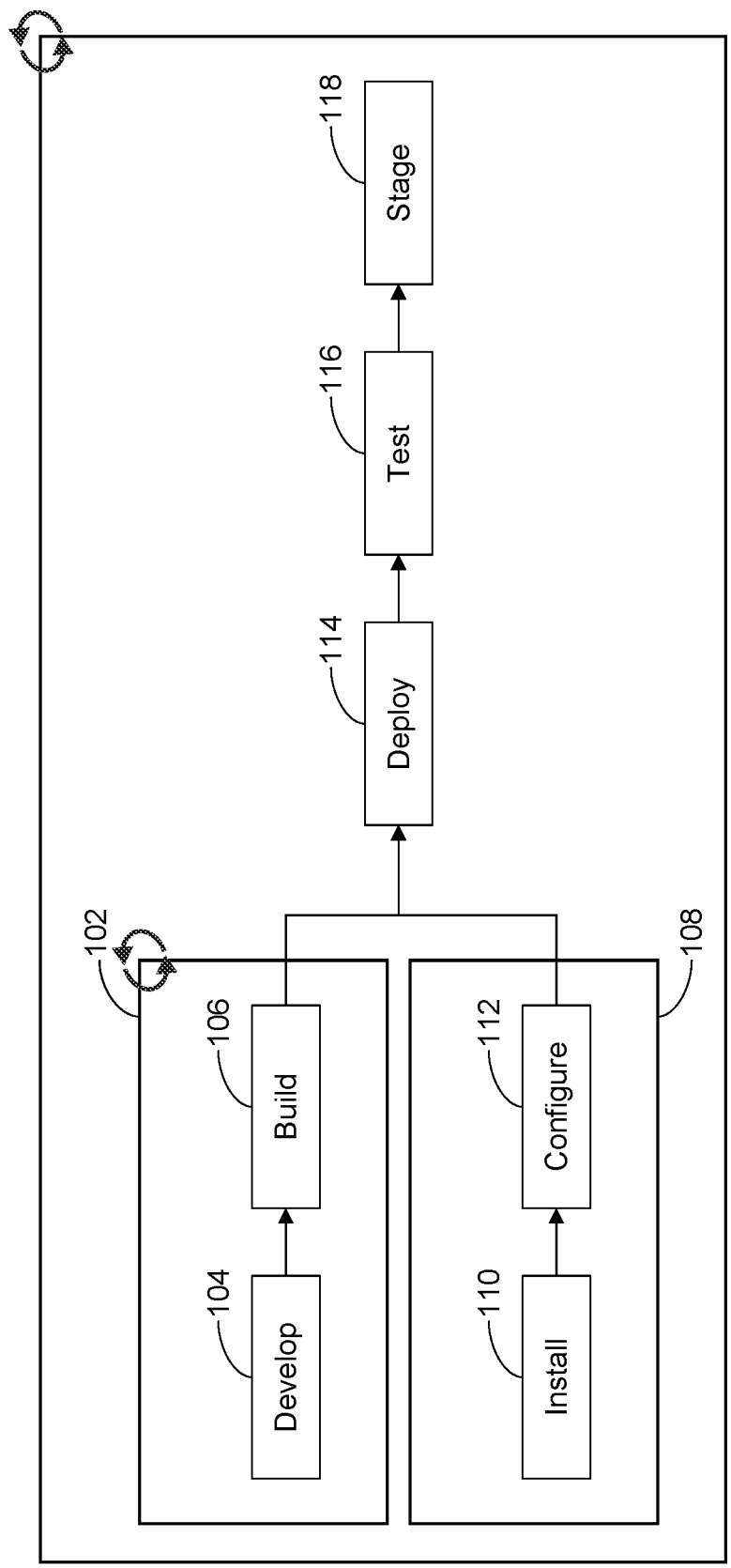
FIG. 1 a block diagram providing a high-level overview of the tasks that developer and platform providers manage when leveraging serverless technology.
Figure 2:
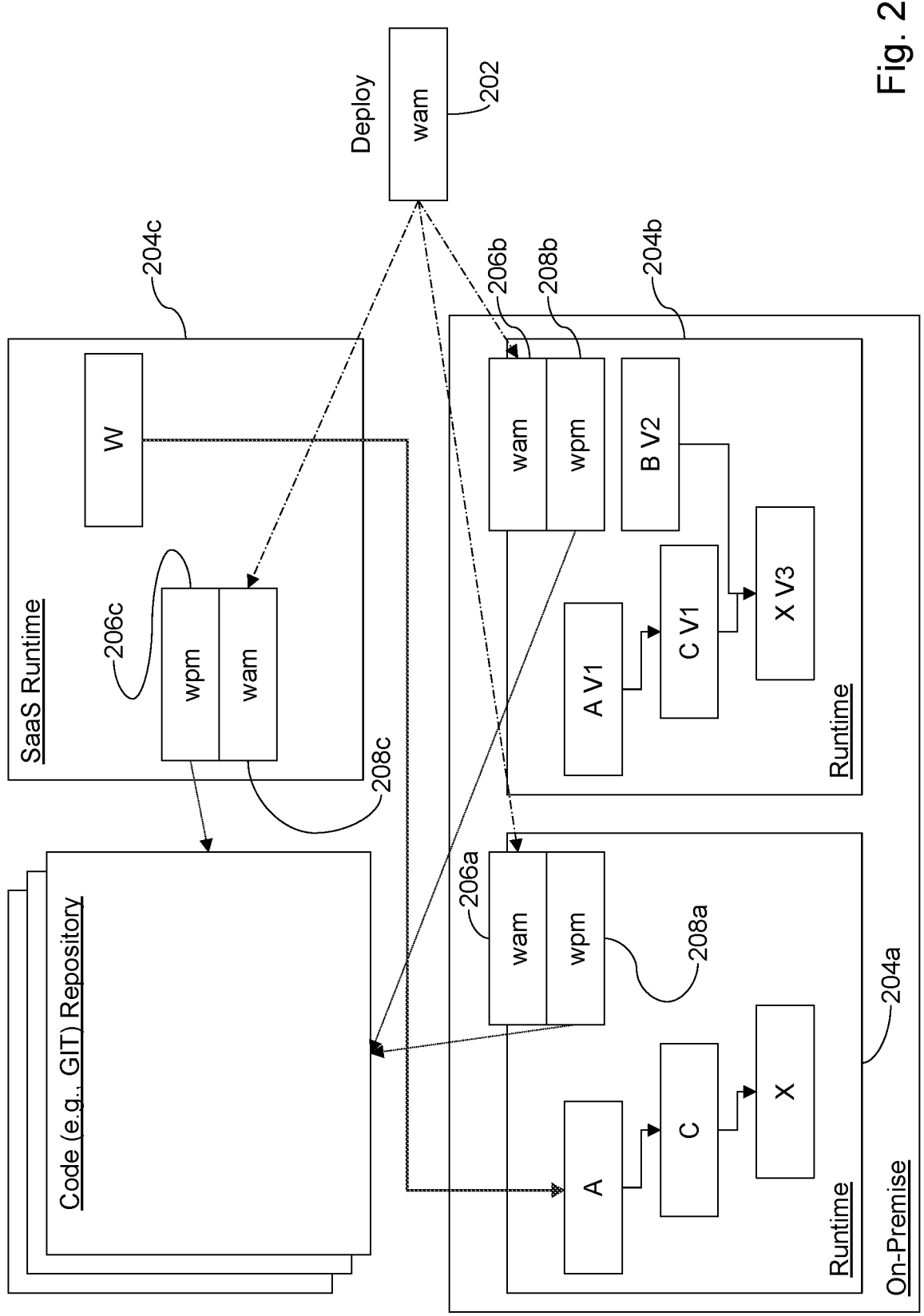
FIG. 2 is a block diagram showing one example complex integration that traverses multiple runtime environments, in accordance with certain example embodiments.

Referring now more particularly to the drawings, FIG. 2 is a block diagram showing one example complex integration that traverses multiple runtime environments, in accordance with certain example embodiments. An application manager 202 (also sometimes called a webMethods application manager or "wam") is provided with details describing the application being developed, and it helps coordinate localized provisioning across multiple servers, e.g., to help ensure that each runtime 204a-204c has the correct components and configuration details needed for the complete application solution to work. In the FIG. 2 example, on-premise servers are provided for the on-premise runtimes 204a-204b, whereas a different server (or different servers) is/are provided as for the SaaS runtime 204c. It will be appreciated that more or fewer servers, runtimes, and/or the like, may be provided in different example implementations.

Also, it will be appreciated that each runtime may be provided via one or more servers. Each server may be backed by processing resources including at least one processor, memory, storage, and other structural components.

In FIG. 2, the dotted lines represent dependencies during the deployment phase. The solid lines represent the flow of the runtime execution across the different runtime instances. The lettered boxes represent different applications, functions, services, and/or other bundles of program logic that may be invoked by a suitable messaging protocol, API call, and/or the like. As indicated in FIG. 2, these different bundles of program logic may be versioned. As explained in greater detail below, the deployable application manager 202 can take a project scaffold detailing a working solution and map that to distinct servers via individual agent manifest files that are then communicated to the relevant instances 206a-206c. The application manager is polymorphic in that it runs on these simple servers, but instead of accepting a scaffold (as per 202), it is driven by the agent manifest in order to provision the local runtimes 204a-204c. The application manager delegates the installation of individual features to the webMethods package manager ("wpm") instances 208a-208c. The package manager can be used from the different runtimes 204a-204c and pulls the code from the relevant source repository based on the source endpoints provided in the agent manifest or the wpm server if used separately.

The approach shown schematically in FIG. 2 advantageously provides for cross-platform deployment, pre-/post-configuration, and rollback functionality ensuring a fully working solution can be deployed simply (e.g., with a few simple commands or potentially with a single "click"). Pre-/post-configuration enables actions to be specified and executed before and/or after each runtime installation. Rollback enables deployments to be reversed so that the solution can in whole or in part revert to a previously-known state. Further details concerning these features are provided below.

Example Implementation

Details concerning an example implementation are provided below. It will be appreciated that this example implementation is provided to help demonstrate concepts of certain example embodiments, and aspects thereof are non-limiting in nature unless specifically claimed. For instance, the scaffolds, scaffold maps, agent manifests, command-line interfaces, switches, yaml (yet another markup language) and/or other snippets, etc., are provided below to ease understanding of the example embodiments described herein and are not limiting unless explicitly claimed.

Example Application Manager

The application manager in certain example embodiments is a command line tool that can be integrated into a continuous integration and continuous delivery (CI/CD) process. CI may be thought of as being a coding philosophy and set of practices that drive developers to implement small changes and check in code to version control repositories frequently, while CD may be thought of as automating the delivery of applications to selected infrastructure environments, e.g., including pushing code changes. Application manager instances in certain example embodiments are driven by command line switches or other interfaces, and a scaffold. The scaffold may be provided in any suitable format such as, for example, a yaml file, an Extensible Markup Language (XML) document, a JavaScript Object Notation (JSON) document, and/or the like. The scaffold defines a set of deployable assets for a given project/solution, as well as the required connectivity and configuration in order for the solution as a whole to function. The connectivity and configuration can be defined for individual runtimes/services and for collections of runtimes/services—and/or for the project as a whole. In addition, or in the alternative, in certain example embodiments, the same project can be mapped to more than one target environment that may involve different endpoints, e.g., as more concretely discussed in the subsequent paragraph.

Figure 3:
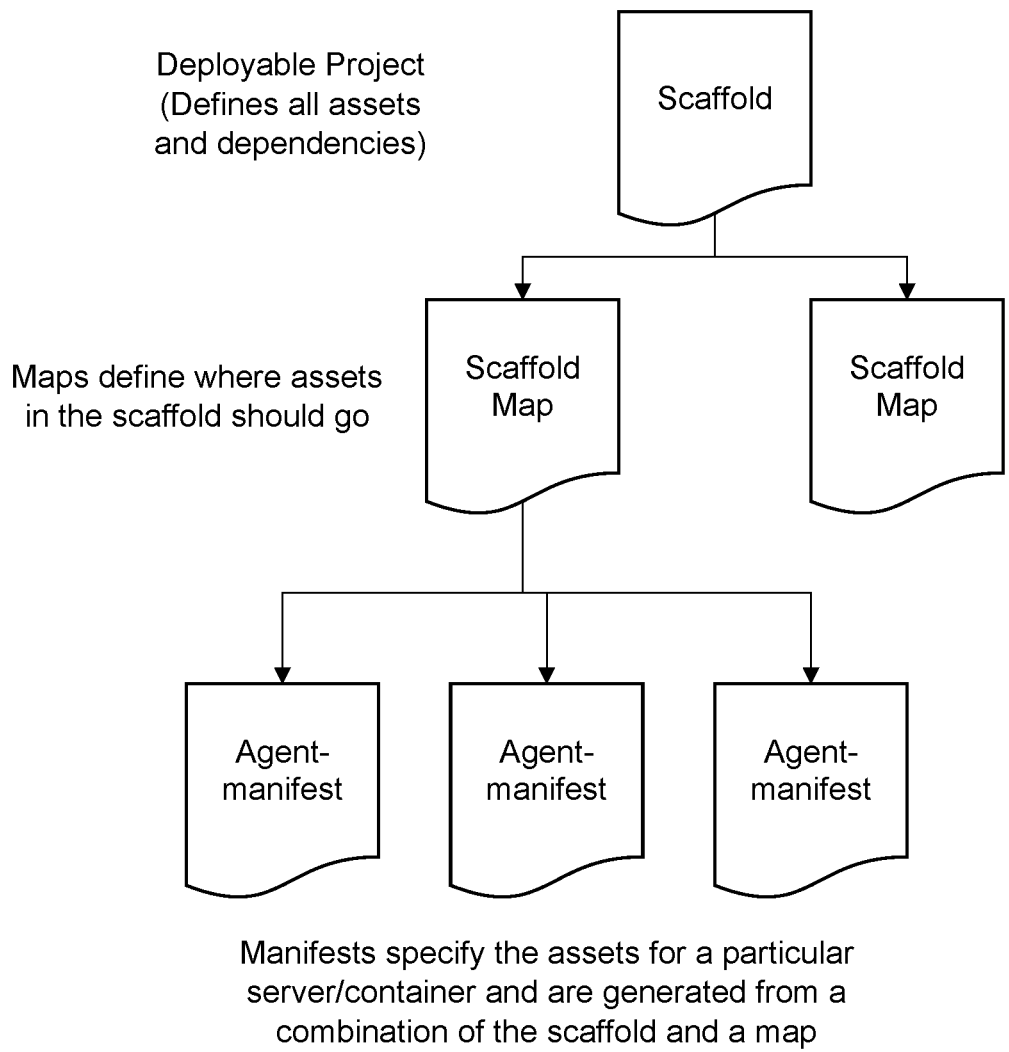
FIG. 3 schematically shows how an example scaffold is constructed, in accordance with certain example embodiments.

FIG. 3 schematically shows how an example scaffold is constructed, in accordance with certain example embodiments. In order to deploy these assets, a scaffold map is provided. The scaffold map defines how the scaffold should be mapped to specific runtime components, providing the host server and specific configuration/connectivity for each asset given in the scaffold. The webMethods application manager combines the scaffold and map together in order to generate an agent manifest for each targeted server including the required assets and updated configuration and connectivity. The agent manifests are then used in turn by the webMethods application manager installed on the targeted server to provision and configure it, e.g., to pull package features from remote code repositories and configure the platform settings. Different maps can be created for the same scaffold to allow the same assets to be deployed to different environments such as, for example, Development, User Acceptance Test (UAT), Test, Production, and/or other environments, e.g., without necessarily having to duplicate the scaffold. In this regard, the one scaffold in the FIG. 2 is shown as having associated with two different scaffold maps, which may enable the same scaffold to be deployed to two different environments.

In certain example embodiments, the application manager is polymorphic in that it can take as input a complex project (a scaffold) and generate agent manifests for each runtime container, or it can take an agent manifest to in turn provision a local runtime instance. In this sense, an agent manifest is a subset of a scaffold pertaining to a single runtime instance. A given scaffold map may be associated with 0, 1, or more agent manifests.

The application manager in certain example embodiments is configured to enable distribution of commercial export license restricted software, open-source packages/components, customer-specific developed packages/components, etc. Access control can be used in these and/or other regards, e.g., to limit access to the repositories for these packages, in which case the package manager can be configured to either use repository credentials and/or tokenization services provided via the agent manifest or indirectly via the package manager registry using the developer's identity. For instance, the package manger server can in certain example embodiments request a token via an OAuth 2.0 type handshake or the like. The latter helps to ensure that the package manager can be used individually from the command line (or other interface) without requiring the application manager if and where a developer wants to arbitrarily add components to the local environment. In certain example embodiments, the package manager may be deemed an integral sub-component of the application manager that helps ensure specific features can be installed and configured easily.

Figure 4:
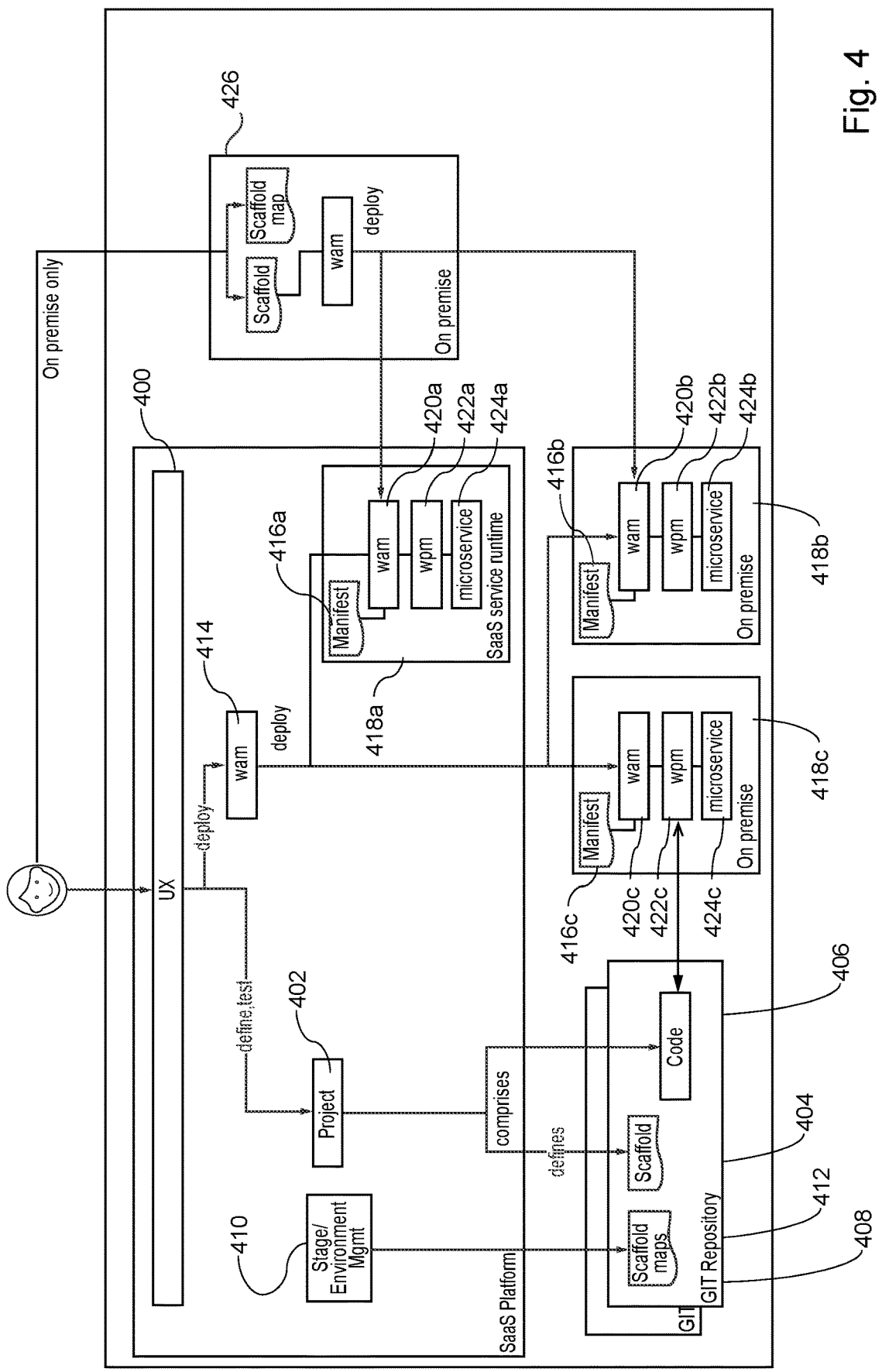
FIG. 4 is a block diagram showing detailed steps and components involved by the application manager and package manager when deploying a complex service across multiple instances, in accordance with certain example embodiments.

FIG. 4 is a block diagram showing detailed steps and components involved by the application manager and package manager when deploying a complex service across multiple instances, in accordance with certain example embodiments. It shows how through a user friendly SaaS based user experience (UX) a complex solution can be deployed (potentially with a single click or a few simple actions) across both cloud and on-premise infrastructures. The platform components that represent 418c and 418b represent running containers based on prebuilt images that contain both the application manager and package manager running locally as well as the microservice runtime into which component/package will be installed. The application manager component automatically self-registers with the cloud platform to announce its availability for use on startup, after which it awaits an incoming agent manifest in order to trigger the installation/provisioning process. In greater detail, a developer defines a project 402, which is a collection of distinct functions/services, using a user interface/user experience tool 400. The User Interface/User Experience (UI/UX) tool 400 can be command-line driven, include a graphical user interface, etc. It may be accessed via a developer's computer system (e.g., which may include at least one processor, a memory, storage, input/output (I/O) devices, etc.). The functions/services can be run in the cloud or deployed across a complex topology of tenants and on-premise servers. The project 402 is defined by a yaml or other file called a scaffold 404 that maps the source code 406 to logical entities along with necessary configuration and dependencies used in implementing the functions/services.

The scaffold 404 and source code 406 are persisted in a source code repository 408 (or multiple repositories) of the developer's choice. GIT or other repositories may be used in certain example embodiments. Developers define different deployment environments such as development, test, production, and/or other environments. This definition process in turn generates a scaffold map for each target environment to which the project is to be deployed. In the FIG. 4 example, a stage/environment management tool 410 helps define these scaffold maps 412. Similar to the aforementioned SaaS UX, it can help facilitate deployment through simple actions. The stage/environment management tool 410 includes a UI/UX that allows developers to create the required scaffold map indirectly. It can list all the given assets and connectivity provided by the scaffold, allowing developers to set the server on which the asset would run and also set up the necessary end-points. It will be appreciated that these additional properties may not be written to the scaffold itself, but instead may be written to a scaffold map file, thereby allowing multiple environments to be configured from a single scaffold by providing multiple scaffold maps. The scaffold 404 and scaffold maps 412 drive the application manager component 414 to generate agent manifests 416a-416c for each runtime environment 418a-418c and to propagate them to the remote runtime environments where they are consumed by a locally installed application manager instance 420a-420c. Each runtime environment 418a-418c also includes a package manager instance 422a-422c. Further details concerning the package manger instances 422a-422c are provided below. In the meantime, it is noted that the application manager instances 420a-420c and the package manger instances 422a-422c relate to the microservices or other programs/functions/services 424a-424c in each of the runtime environment 418a-418c. Similar elements are provided for the deployment 426.

Figure 5:
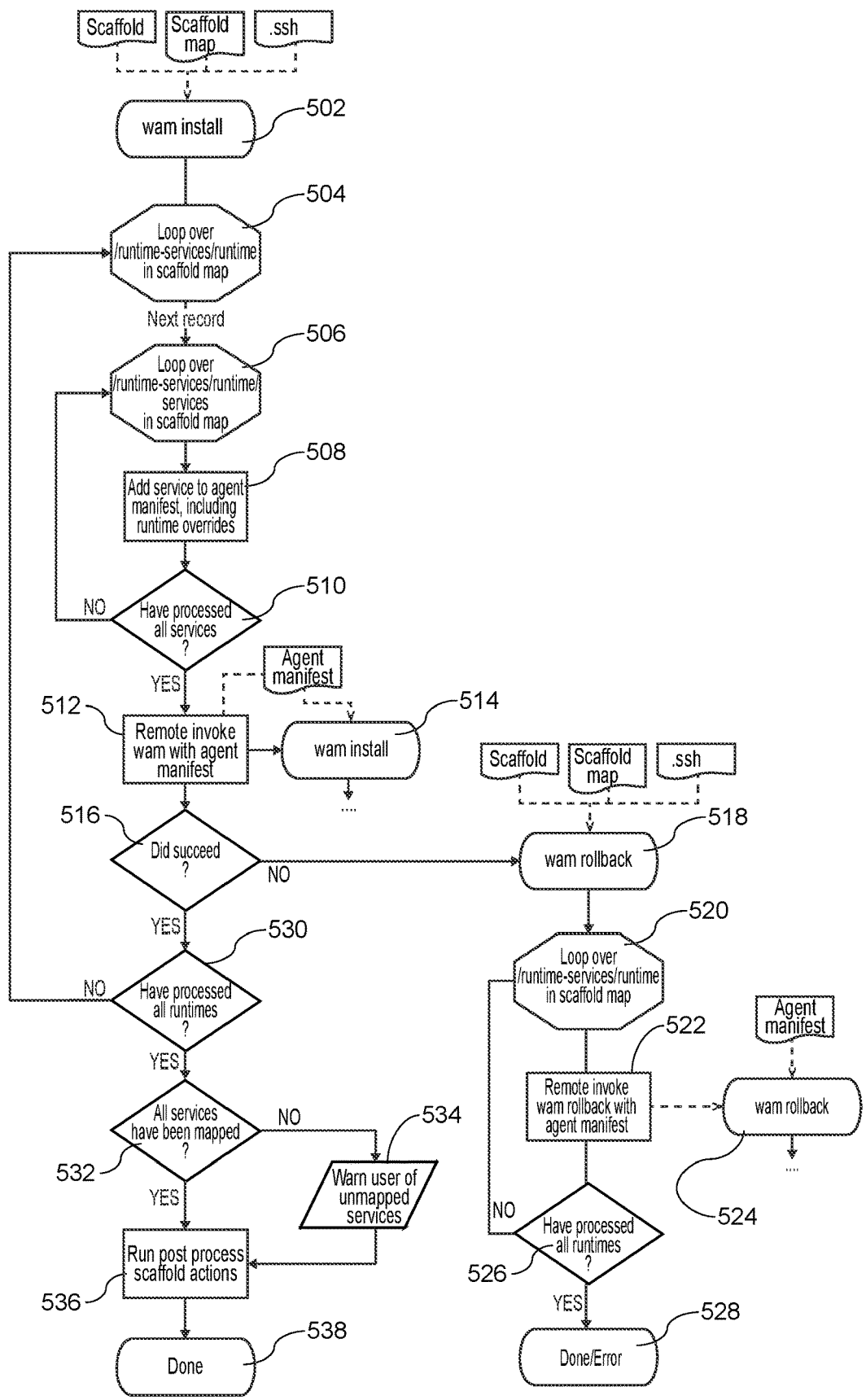
FIG. 5 is a flowchart showing how a complex solution can be installed across multiple runtime instances, in accordance with certain example embodiments.

FIG. 5 is a flowchart showing how a complex solution can be installed across multiple runtime instances, in accordance with certain example embodiments. The application manager install process (502) receives inputs including the scaffold, scaffold map, and a remote call to a runtime application manager component, e.g., via Secure Shell (SSH). The application manager install process (502)

includes starting to loop over each runtime (504), e.g., as enumerated in the received scaffold map. Then, there is a looping over each service in each runtime (506), e.g., as once again enumerated in the received scaffold map. The looping over the runtimes and the services may be facilitated by providing scaffolding-related information in a directory structure like format, e.g., where runtime services are grouped by runtimes. Each service in the respective runtime being looped over is added to the agent manifest (508). This includes runtime overrides, which may be used to modify property and/or configuration details of a given runtime service such as, for example, replacing an endpoint to point to a different data source or replacing a property dictating runtime mode from "test" to "production." A determination is made as to whether all services for the respective runtime have been processed (510). If a determination is made that not all services for the respective runtime have been processed, then the loop continues for the respective runtime.

If a determination is made that all services for the respective runtime have been processed, then the application manager is invoked remotely with the appropriate manifest (512), and the application manager instance is installed for that runtime (514). The application manager instance installation, which uses the agent manifest, is explained more fully below, e.g., in connection with FIG. 6.

A determination is made as to whether the application manager instance installation is successful (516). If not, application manager instance rollback (518) is attempted, with the aid of the scaffold, scaffold map, and remote call. This application manager instance rollback (518) includes looping over the runtimes (522) previously processed as part of (520) for the given service and attempting the actual rollback, whereby packages are replaced with the previously-installed versions and any changes configuration are reset. This is possible because the local application manager in certain example embodiments automatically retains a copy of all previously processed agent manifest files (524). A determination is made as to whether all applicable runtimes have been processed (526). If not, then the looping continues. If so, the process is concerned done, albeit with an error (528).

If a determination is made that the application manager instance installation is in fact successful, then a determination is made as to whether all runtimes have been processed (530). If not all runtimes have been processed, then the loop continues (504). However, if all runtimes have been processed, then a determination is made as to whether all services have been mapped (532) (no rollback was initiated within a given service loop). It will be appreciated that rollbacks are performed with the context of a single service that maps to more than one server, but a rollback as described above does not preclude the deployment of services and does not mean that all services will be rolled back. If not, then the user is warned of unsuccessful service mappings (534). If all services have been mapped, or after the user has been warned, then any post-processing scaffold actions that are needed are run, such as, for example, restarting the runtime, running a post-install service to migrate data or update a database schema, etc., which are listed in the scaffold file (536). After this, the installation of the complex solution is considered complete (538).

The agent manifest (referred to above in connection with operations 512 and 514) is a subset of the scaffold file for a specific runtime. When processing the agent manifest, the wam component leverages the wpm command-line interface or other tool to retrieve (e.g., download) features or components from the indicated repositories. These features or components could include, for example, commercial features from the assignee or other provider, third-party features/components, the developer's private code comprising their solution, etc. The wam applies configurations and actions defined in the agent manifest, once the wpm operation(s) has/have been completed. Similar to the scaffold processing post-installation steps, these are collected in the agent manifest and run locally once the application manager has completed.

Figure 6:
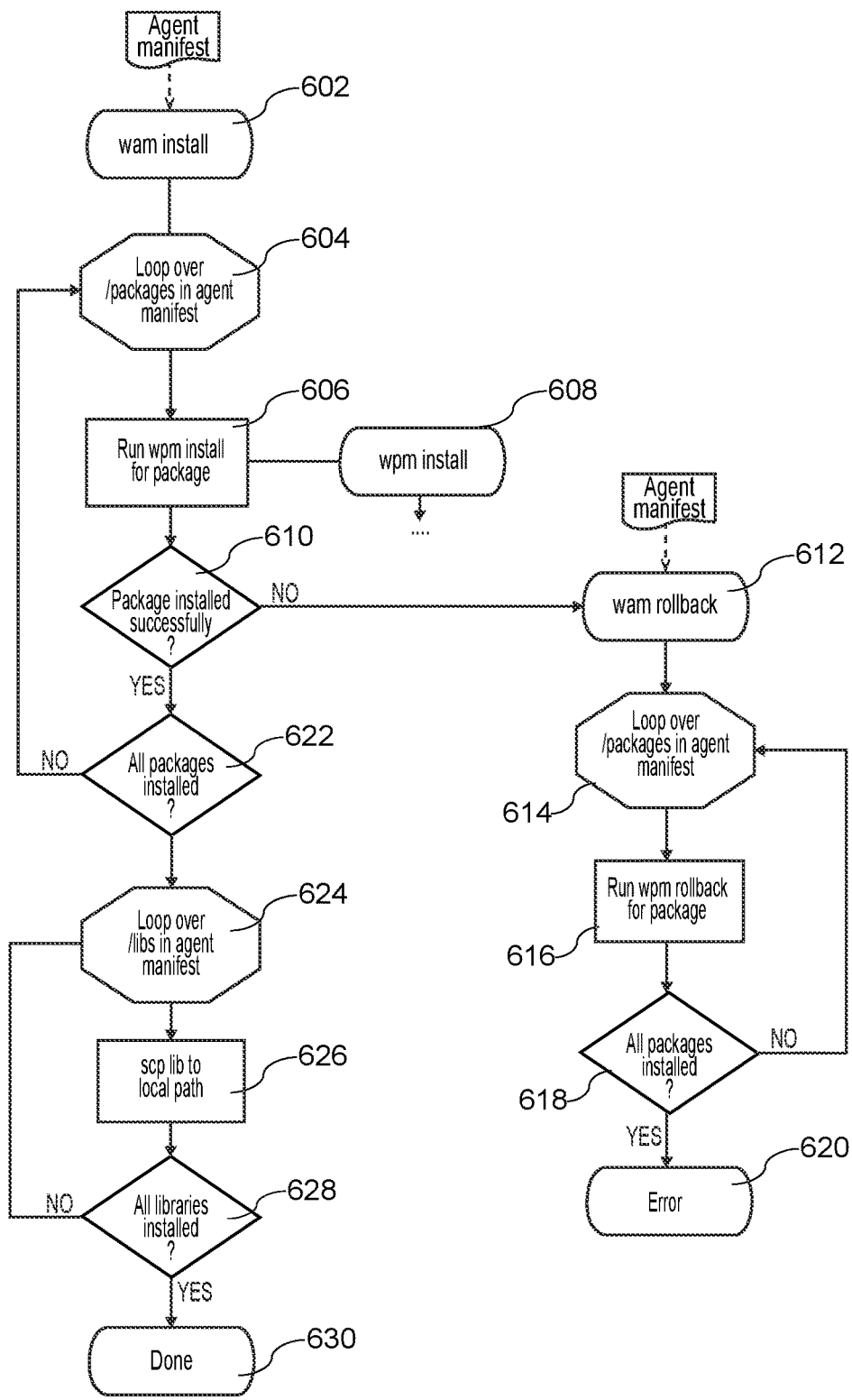
FIG. 6 is a flowchart showing the installation for a given runtime instance from the agent manifest generated from the scaffold, in accordance with certain example embodiments.

In this regard, FIG. 6 is a flowchart showing the installation for a given runtime instance from the agent manifest generated from the scaffold, in accordance with certain example embodiments. The application manager installation process (602) involves looping over all packages defined in the agent manifest for the given runtime (604). A package may be thought of as being a deployable component that is self-contained. A package thus may lack dependencies to other packages. The package manager is run for the respective package (506), causing installation of a local package manager instance (608), e.g., as described in greater detail below.

A determination is made as to whether the package was installed successfully (610). If a determination is made that the package was not installed successfully, the corresponding package manager instance is rolled back (612). This rollback includes looping over the packages in the manifest (614), and rolling back individual package instances to the previous version, e.g., as dictated by a previously archived agent manifest (616). A determination is made as to whether all package instances are uninstalled (618) and, if so, the process terminates in an error (620). If not, the rollback continues.

If a determination is made (as in operation 622) that there are more packages to be installed, then the main loop continues as shown in FIG. 6. However, if a determination is made that all packages are installed and successfully so (as in operation 622), then the process loops over the libraries in the manifest (624). Individuals libraries are copied (e.g., secure copied with the scp command or the like) to the appropriate "local" path (626). A determination is made as to whether all libraries are installed (628) and, if so, then the process is complete (630); otherwise, the copying of libraries continues.

The application manager can operate transparently to the developer, e.g., with the necessary scaffold generated automatically as part of the SaaS infrastructure. The runtime component of the wam may be packaged as part of the provider's runtime container and thus also may be hidden from or transparent to the developer in that it is called directly from a wam server in the SaaS platform with the necessary agent manifest (e.g., with this runtime container potentially being based on an image such as an Open Containers Initiative (OCI) image provided by the SaaS provider). In certain example embodiments, the developer nonetheless may be able to choose to leverage the wam in standalone mode in the developer's local environment, e.g., by defining their own scaffold file and running the wam command-line tool themselves (e.g., as the application manager itself may be made publicly downloadable from a public website or the like). The following is an example of such a command:

```
$ wam install -u john.appleseed@somewhere.com -p ****** -m dev-
    mapping.yaml myscaffold.yaml
```

The above command will attempt to provision a working solution based on the given scaffold file using the wpm credentials john.appleseed@somewhere.com with the server mappings/configuration provided by mappings.yaml file (-m||--map). The application manager will first generate an agent manifest for each server in mappings file and then attempt to send it via SSH to the server and execute the wam cli tool. The remote servers will then install and configure the package using the given credentials via the package manager.

Example Package Manager

The package manager is a command line or other tool that can act as a manager for SaaS packages and other third-party components. The package manager is used by the application manager to install individual assets as described in the agent manifest file, and/or can be used independently for standalone purposes.

The package manager provides some or all of the following and/or other features:
  Provides installation of SaaS or other "official" provider components (including, for example, those components that are not open source and/or include license restrictions);
  Receives and makes available components contributed by a developer community (such as, for example, open source or other components);
  Support installation of non system specific and/or non platform specific provider and/or other components;
  Support both hot and cold deployment;
  Provides a lightweight offline mode, e.g., which does not need to connect to the cloud infrastructure but instead can identify source repositories via local configuration files only (for example);
  Supports component signing, e.g., as packages may be signed as part of registration process; and
  Enables checking as to whether a package has been changed since registration.

In certain example embodiments, the package manager is configured to communicate via one or more centralized registries to allow developers to distribute and find packages for use in their projects. These registries can be private or public including community-oriented public repositories. The package manager of certain example embodiments can be used independently of the application manager command, e.g., via switches, to allow developers to download individual components in a "hot" mode, or in scripts as part of a "cold" build process (e.g., as with a Dockerfile, for example).

Example Package Manager "Online" Mode

Figure 7:
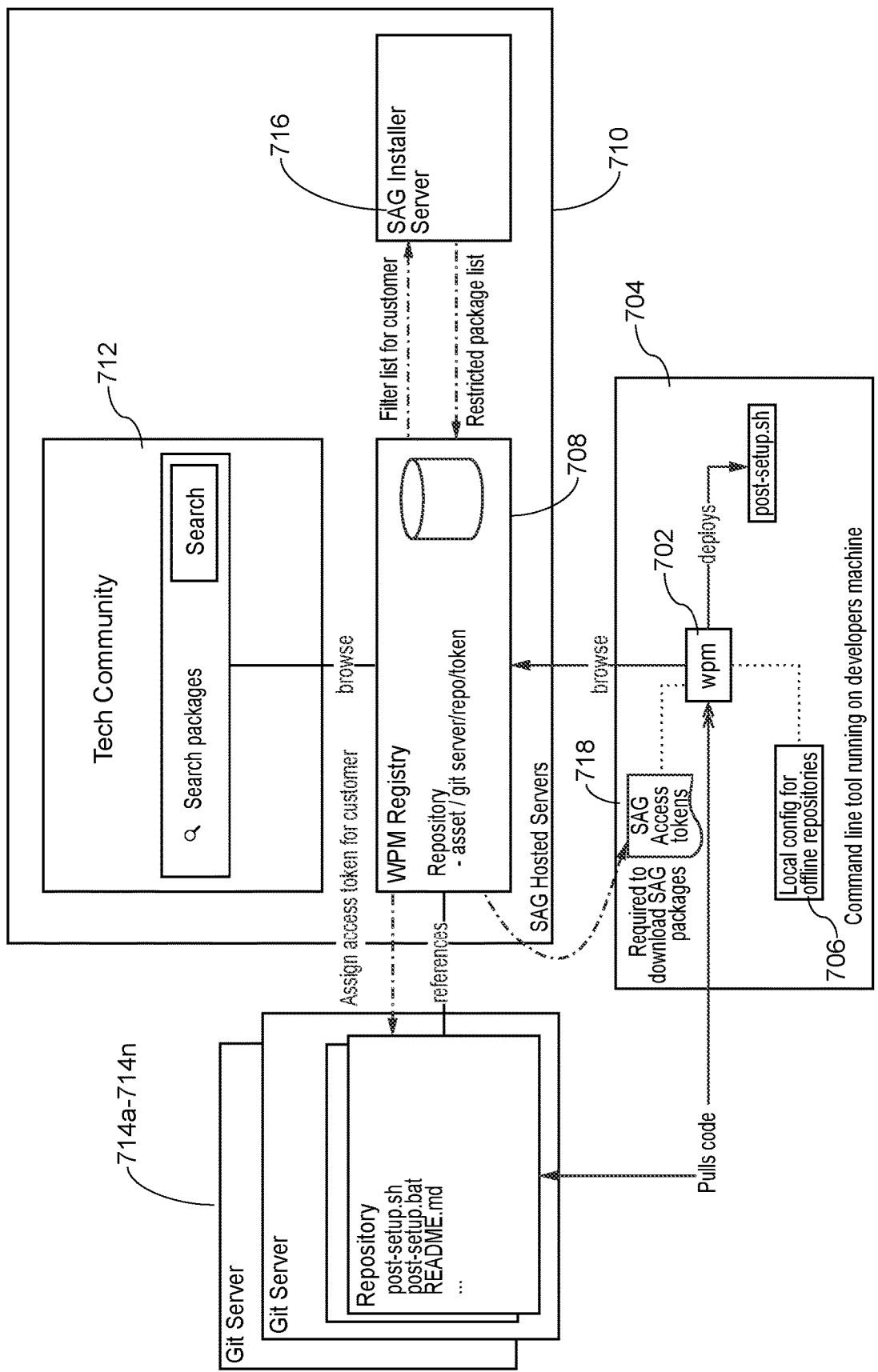
FIG. 7 is a block diagram showing cloud infrastructure used when the package manager command is used in "online" mode, in accordance with certain example embodiments.

FIG. 7 is a block diagram showing cloud infrastructure used when the package manager command is used in "online" mode, e.g., to allow available components to be queried and relevant metadata to be fetched in order to download them, in accordance with certain example embodiments. The wpm command line tool 702 is installed locally on the developer's machine 704. In certain example embodiments, it comprises a command line (or other interface) tool and a self-contained configuration file for simple installation. It can be downloaded separately or bundled with a microservice runtime product in different example embodiments. The wpm command 702 can either work offline via the local configuration 706 or query a central library/registry 708 managed in the cloud ecosphere 710, e.g., using a search interface 712. The local configuration 706 may in certain example embodiments be a json or other file providing a list of code repositories so that packages can be fetched without having to query a central registry. The wpm command 702 allows the developer to query available packages from different repositories 714a-714n and retrieve the necessary connectivity properties for the source code and then download them from indicated server/repositories 714a-714n.

Thus, the wpm library/registry 708 does not host the components themselves, and it instead can simply references them. The wpm library/registry 708 may in certain example embodiments store a signed signature for packages that the package manager 702 compares against to determine whether the packages have been modified since registration. The dash-dot lines shown in the drawing are related to this process.

In addition, the developer can reference different registries such as, for example:
  Software Aktiengesellschaft (AG) Official: Hosts Software AG's webMethods packages, allowing developers to extend the functionality of their webMethods Integration Server as an alternative to on-premise installations. Software AG packages may be restricted based on licensing, geographical export restrictions, and/or other aspects (e.g., as discussed below). Other SaaS or "official" repositories may be used in different example embodiments alone and/or in combination with the Software AG official repositories.
  Developer Public: Hosts webMethods or other public repositories from and for the developer.
  Wild West: Hosts webMethods or other packages shared by developers, providing a mechanism for developers to share and collaborate on packages that they wish to share with the general public and are open to anyone.
  Private Registry: Hosts any components that a developer is developing as a part of a project and in which the developer wants to leverage the package manager as a tool of choice in generating builds. This registry may be made accessible only to project owners in certain example embodiments.
  Local: A developer-installed and/or curated registry, managed by the developer. This may include packages shared by developers, providing a mechanism for developers to share and collaborate on packages that they wish to share with the general public (and in some instances are only made available to registered developers).

As alluded to above, components also can be searched online via a tech forum/community or the like. For instance, in certain example embodiments, developers can choose to run the components in a "sandboxed" mode to ensure that others cannot syphon or access sensitive data from the runtime environment. Sandboxing may be made available to developers when using packages that have not been officially signed, e.g., to help ensure that the packages cannot operate outside of strict perimeter limiting access to file systems, remote servers, shared resources, and/or the like.

Example Package Manager "Offline" Mode

Figure 8:
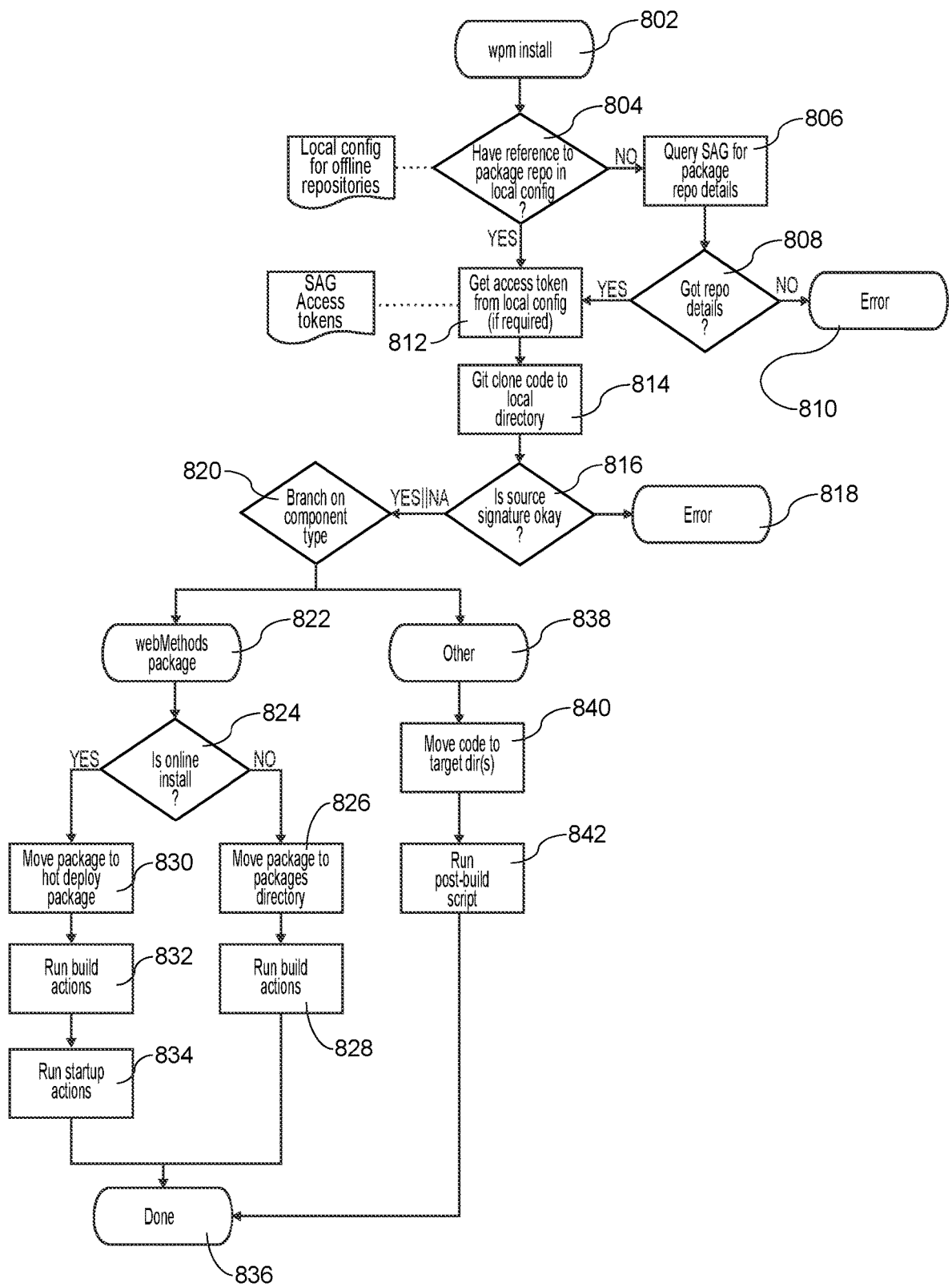
FIG. 8 is a flowchart showing component installation with the package manager install command operating in an offline mode, in accordance with certain example embodiments.

If required, the package manager command can be used without any access to a registry. Instead, switches, a local file, or other framework can be used to provide a list of available packages and their repository details. In this regard, FIG. 8 is a flowchart showing component installation with the package manager install command operating in an offline mode, in accordance with certain example embodiments. The package manager install process (802) first determines whether there is a reference to a package repository in a local configuration (804). This may be performed in connection with a local configuration file or the like. If not, then the provider is queried for package repository details (806). An attempt is made to retrieve the repository details (808), and if they are not retrieved successfully, then the package manager install process ends in an error (810).

If the repository details are successfully retrieved (from 808), or if there is a reference to a package repository in a local configuration (fro 804), then an access token is retrieved, if appropriate (812), e.g., from a local or remote store or list of available access tokens.

Code is retrieved and potentially stored locally (814). If the signature is not valid (as determined in 816), then the package manager install process ends in an error (818). However, if the signature is valid (as determined in 816), then the process branches depending on the component type (820). For example, if the package is from the provider (e.g., if it is a webMethods package as in 822), then a determination is made as to whether the installation is to be performed in online mode or in offline mode (824). If a determination is made the installation is not to be performed in online mode, then the package is moved to the packages directory (826), and build actions are run (828). If a determination is made the installation is to be performed in online mode, then the package is scheduled for hot deployment (830), build actions are run for the hot deployment (832), and startup actions are performed (834) in accordance with the online installation/hot deployment.

If the package is not from the provider (e.g., if it is from a public or open source library, proprietary on-premise source, etc., as in 838), then the appropriate code is moved to the target location(s), which may be network or local directories for example (840). A post-build script is then run (842).

Once the build actions are run (828) for a non-online provider package, startup actions are run (834) for an online provider package, and/or a post-build script is run (842) for a non-provider package, the process is complete (836). These scripts are provided by the components themselves, in certain example embodiments respecting a placement and naming convention dictated by to ensure that the package manager can locate and run them. These scripts can perform functions such as, for example, migrating data from a previous format to a new format, updating the database schema, reloading a library or data into a cache, etc.

Certain example embodiments provides support for license/export restrictions. That is, the package manager of certain example embodiments can be used to distribute export-restricted and/or licensed software. Referring once again to FIG. 7, this may be accomplished by using the wpm command 702 to obtain a list of access tokens to allow a specific developer to access restricted repositories from among the repositories 714a-714n. This list may be retrieved as a file or the like, and it can be generated on the cloud side 710 by querying the appropriate licensing database 716 to determine the packages that the developer is allowed to download or otherwise access. An access token is then defined for each implicated component repository, and these access tokens may be download to or otherwise accessible by the client computing system 704. For example, an access tokens list 718 may be maintained on the client computing system 704. This process is transparent to the developer and helps ensure that each developer has their own unique view of available packages based on their geographic/political, licensing, and/or other applicable constraints.

The wpm command can use the appropriate access token in order to connect to each repository and ensure that the restricted package/component can be downloaded. For example, the following may be used:

```
$ wpm acl -v latest -u john.appleseed@somewhere.com
  -p ******
```

The command may be repeated if any of the developer's licensing or export restrictions change.

Certain example embodiments provide support for installation of components provided by other providers. For example, a commercial implementation from the assignee would support webMethods components and also non webMethods components. Existing package managers generally cannot function in this way. That is, existing package managers typically do not allow developers to use a single tooling to build an end-to-end solution comprising multiple different vendors' components and products. For example, NPM only applies to JavaScript libraries, apt-get is an OS-level component and the resulting download would still require configuration prior to use, etc. By contrast, the following can be used:

```
$ wpm install -r jc-private-helloworld-proj TomCatExtension -v
  latest -c
  org.apache.catalina.core.StandardHostValve.ACCESS_SESSION=true
```

This example allows for the installation of a custom component into an Apache Tomcat server running locally with property injection specific to the component being made via the -c switch. In certain example embodiments, the installation and configuration is not handled directly by the wpm command but instead is delegated to a script provided via the component itself. For example, a post-setup.sh or post-setup.bat can be used. The -c switch in this example helps ensure that custom properties can be injected to the deployment process, e.g., because the post-processing script is aware of attribute being used. The project being developed provides a post-setup script to support this feature.

As indicated above, certain example embodiments support both hot and cold deployments. The package manager, unlike other available platform package managers, supports both hot and cold deployments. It can be referenced in a Dockerfile, for example, to build a docker image offline or via the command line to update a currently running server. The package manager of certain example embodiments also has the program logic to correctly deploy a package into a cold or hot/running environment. The following command may be used, for example:

```
$ wpm install -r jc-private-helloworld-proj -hot | cold wm
  JcHelloWorldPackage
```

This example command determines the correct liveness probe based on the asset type to call. If it returns 200 (indicating "alive"), then the package is installed via the hot deploy technique or alternatively cold technique.

The parameters may be provided via a wpm configuration file or the like, e.g., in the .wpm configuration directory, or in accordance with a default specification. The following is an example reference to a configuration file:

```
<home>/.wpm
  - deploy
    - wm.cnf
```

The formatting may be provided as follows:

```
version: "1.0.0"
type: webMethods
livenessProbe:
    endpoint: /invoke/wm.server/ping
    credentials:
    user: admin
    password: admin
deploy:
    action: 200 # response code from liveness probe
    directory: /Integrationserver/replicate/hotdeploy
    preparation:
      type: zip                  # possible values
                                 jar, zip or file/none
      command:                   # optional
                                 command to call
    action: default
    directory: /IntegrationServer/packages
    type: file
```

Developers can chose to define their own asset types, which can greatly simplify the complexity of a very repetitive action.

Certain example embodiments may function in a lightweight offline mode. For instance, in some scenarios, developers can choose to not use the provider's library (or libraries), and instead can choose to use a local private registry. As still another alternative, the wpm command can be driven entirely by the local environment via a configuration file, environment variables, command switches, and/or the like. This option may negate the need for a central server in some instances. The following may be used in this regard:

```
>home>/.wpm
    assets
      helloworld-project.cnf
      company-wide-assets.cnf
```

Here, each file may list the available packages and the relevant repository.

Certain example embodiments provide support for sandboxing, as noted above. Allowing non-validated packages to run within an organization can present security issues, especially in connection with an integration platform where sensitive data is circulating. Nefarious code could syphon off data and transmit to outside entities, inject malware, trigger unwanted updates into internal applications, etc. Typical sandboxing (e.g., isolating components in dedicated runtimes with limited external access) generally cannot be enforced in an integration platform, as the integration logic actively requires access to and from different data sources, and needs to be run from within a shared runtime. Certain example embodiments nonetheless can impose sandboxing on the runtimes through the use of security profiles that leverage Java security and (for example) the webMethods invoke engine to restrict access to both internal and external resources.

In certain example embodiments, these restrictions may not be managed or configured by the local developer, but instead may be imposed by the package manager command in relation to the package's "trust" level.

The trust level of a package may be dependent on the registry that it belongs to and whether it has been flagged for trust worthiness by a wpm user with sufficient privileges. The following is an example of a trust-related command:

$ wpm trust -r jc-private-helloworld-proj JcHelloWorld-Package

It will be appreciated that packages that have been trusted may be digitally signed. Thus, if code changes are made since they were last trusted, they may be considered no longer trustworthy and hence sandboxed.

Packages also can be installed with sandboxing restrictions explicitly by the developer. For example:

$ wpm install -r wm-public WxConfig -sb true

In this example, the package WxConfig will be sandboxed when running in the integration server to ensure that data cannot be syphoned, and that the "internals" of the system cannot be touched.

Sandboxing may be used for components of the provider and not necessarily other package types. Untrusted packages may be limited in different ways, e.g., depending on the type of service. For example, flow-based interpreted services are related to the assignee's integration language called Flow. Flow is an interpreted language that is then orchestrated through an "invocation" manager. The invocation manager when running services in a sandboxed package may enforce the following controls:

Block all admin access (invoke of any admin services will generate an exception).

Limit local file access via a whitelist (invoke of wm.pub.file:* will generate exception).

Limit calls to java services via a whitelist.

Only allow Hypertext Transfer Protocol (http) outbound calls that have been vetted via a whitelist (via configuration, otherwise exception will be generated).

In certain example embodiments, violations will be reported via an administration alert system. Administrators can choose to give access, e.g., by providing a "sandbox-allow.cnf" in the components root folder to allow identified servers to be contacted or specific file directories to be queried/written.

It will be appreciated that these restrictions are imposed through the use of the action manager in certain example embodiments, rather than by the developer.

As another example, Java services can either be blocked. If permitted, a defined java.security.Policy or the like can be leveraged to restrict virtually all external access, as in a typical sandbox. In certain example embodiments, external access can be limited so that it is only implemented via flow services, meaning that Java services can be limited to use for, for example, algorithmically complex code and isolated to only the given data, with output provided only to the calling services. Thus Java services in certain example embodiments cannot make any http calls; invoke child threads; make a call to system; use file.io or file.nio; etc. In certain example embodiments, the developer does not have to create/manage the profile, as this can be done implicitly through the coordination of the runtime and instructions provided by application manager and package manager.

Certain example embodiments may involve easing of restrictions on sandboxed components. For example, sandboxed packages in certain instances can be allowed limited access to local/external resources from, for instance, flow services via a configuration file like sandbox-allow.cnf. An example is as follows:

```
http.out=http:[//]localhost:555/wm[.]server/ping,
    https:[//]petstore[.]swagger[.]io/v2/swagger[.]json
file.reach=./packages/MyPackages/resources/config.cnf, /tmp
file.write=/tmp
java.services=jc.tools.pub.list:containsString
```

Certain example embodiments provide support for dependency checking. Like other package managers, certain example embodiments support dependency checking for the provider's own packages.

As noted above, certain example embodiments may provide rollback support. The wpm command in certain example embodiments is capable of rolling back changes to a last known state using the -snapshot switch, for example. Any or all changed components may be archived to the named snapshot, e.g., with the possibility of restoration through the restore switch. The following is an example:

```
$ wpm -sp /tmp/wpm/snapshots/demo
$ wpm update WmJDBAdapter -v latest        # Archives pre-
   existing package to /tmp/wpm/snapshots/demo
$ wpm install -r wm-public WxConfig        # Records as new
   package via .snapshot.cnf in /tmp/wpm/snapshots/demo file
$ wpm rollback /tmp/wpm/snapshots/demo     # moves archived
   package from /tmp/wpm/snapshots/demo directory and deletes
   WxConfig package as recorded in .snapshot.cnf file.
```

Based on the foregoing description, it will be appreciated that the combined application manager and package manager related techniques of certain example embodiments are unique in relation to other platform managers, e.g., in that they can work in an offline mode without requiring a centralized registry server, are language independent and also application agnostic, and allow for property injection via a post-setup script or the like. In contrast, current package managers tend to be mostly OS specific (which is the case, for example, with yum, apk, winget, and others) or language specific (which is the case with, for example, pip, npm, xrepo, and others). Exceptions such conda/mamba are language agnostic but do not provide high-level application-wide deployment options as described herein. The package manager of certain example embodiments helps deploy working solutions and opposed to program modules.

The combined application manager and package manager related techniques of certain example embodiments also provide a mechanism for provisioning a complex integration across multiple platforms and runtime servers, while ensuring coherent operation between them. Simple command-line interface or other tools advantageously allow multiple runtime servers to be provisioned to help ensure coherent cross-platform installation and/or upgrades with integration dependency checking, code signing, access control, and validation.

The package manager component of certain example embodiments advantageously supports installation for both enterprise licensed components and open source community driven integration components. This includes, for example, support for the installation of both SaaS or other provider-licensed components and community-driven components, with identical tooling being used.

The package manager component of certain example embodiments also advantageously helps enforce sandboxing for untrusted packages. Components registered with the provider registry, for example, can be trusted and then verified by the package manager command during download and/or implementation. The package manager additionally or alternatively can output a warning, stop a deployment, or deploy in a sandboxed environment to mitigate risk. Packages can be signed as part of a "trust" operation to help ensure that code changes can be detected, in which case a package will no longer be trusted. The combination of code signing, sandboxing, and trust can be combined in a unique manner and provided through common tooling in certain example embodiments.

Advantageously, a scaffold additionally may include a test harness that can be used automatically after provisioning to make sure the deployment, configuration, provisioning, etc., works. A test suite in certain example embodiments can automatically test the application using the test harness.

It will be appreciated that the on-premise servers and SaaS platforms described herein may include hardware elements, including respective computer systems having processors and memories. The memories may store code executable by the computer systems. The computer systems may be communicate with other elements in the overall technology environment via API calls, messaging protocol requests, and/or the like. Although certain elements are described as having command-line or other interfaces, it will be appreciated that other UI/UX tools may be used to provide the same or similar functionality, in different example embodiments. Moreover, the application manager and package manager of certain example embodiments may be provided as software or the like, e.g., running on the above-described and/or other computer systems based on a processor and memory.

It will be appreciated that as used herein, the terms system, subsystem, service, engine, module, programmed logic circuitry, and the like may be implemented as any suitable combination of software, hardware, firmware, and/or the like. It also will be appreciated that the storage locations, stores, and repositories discussed herein may be any suitable combination of disk drive devices, memory locations, solid state drives, Compact Disc Read Only Memory devices (CD-ROMs), Digital Versatile Discs (DVDs), tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

Appendix A: Scaffold Definition

The following presents an example scaffold definition. As explained above, a scaffold defines a distributed service across one or more runtime environments. In certain example embodiments, scaffolding is agnostic as to where each program, function, service, or other bundle of program logic is run. That is, a scaffold does not in itself necessarily care about whether a bundle of program logic is performed in the cloud (e.g., as a part of a SaaS solution) or on-premise.

A scaffold includes the following information in certain example embodiments:

Version: Usable to manage changes to model.
Info/Type: Identifies the type of deployment (e.g., application, service, API, etc.).
Resources: Defines source repositories of components to be deployed.
Services: Represents a "working" unit that can be deployed to a runtime.
Services/Service/Packages: Identifies a deployable component used in implementing the service.
Services/Service/Properties: Identifies configuration detail used by the associated service.
Services/Service/Actions: Commands to be executed prior/after service has been deployed.

An example scaffold is as follows:

```
version: "1.0.0"
info:
    name: "Receive Invoice" # same name wm.io project
    model: int-scaffold
    type: "project" # webMethods wm.io project
    description: "example scaffolding for Integration"
    version: "1.0" # branch version to pulled from repo
    wmVersion: "10.11" # webMethods version to be pulled from sag wpm
      repo
    tags:
      demo
      coucou
resources: # Identify source code repositories
    repo: "mygit"
        https:[//]github[.]com/username/wm[.]git
    repo: "commons"
            https:[//]github[.]com/username/commons[.]git
services:
    service:
            name: "receiveInvoice"
            packages:
              repo: "wpm:sag" # sag official repo - will fetch 10.11
                  WmFlatFile
              repo: "wpm:other" # wild west public repo
                  JcAPITools
              repo: "git:mygit" # git source repository defined by mygit
                  JcInvoicing
                  JcDocTypes
              repo: "git:commons"
                  JcTools
            properties:
                    property: "https[.]port[.]JcInvoicing" # this cannot be
done today, need a feature request for MSR
                        default: "3030"
                        secret: false # if true, assume default is encrypted
and if modifiable can be set via k8s secret
                        modifiable: false # if true, will possible to override
by environment variable.
    service
        name: "submitInvoiceToPurchasing"
        packages:
          repo: "wpm:sag"
              WmJCDBAdapter
              WmFlatFile
          repo: "git:mygit"
              JcPurchasing
              JcDocTypes
          repo: "git:commons"
              JcTools
            properties:
                property:
"artConnection.JcPurchasing.jc.api.purchasing_.services.priv.jdbc.
conn.serverName"
                    default: "mysqldb"
                    modifiable: true # means it could be overridden by an
environment variable of the same name
                    secret: false
                property:
"artConnection.JcPurchasing.jc.api.purchasing_.services.priv.jdbc.
conn.password"
                    default: "{AES}Y5IgMqjfvkgbg7p5VUZztw=="
                    modifiable: true # means it could be overridden by k8s
                        secret of the same name
                        secret: true
    config:
        repo: "mygit"
            file:
                source: "./resources/mysql-connector-java-5.1.47.jar"
                target: "/opt/softwareag/IntegrationServer/lib/jars"
    actions:
        cmd: "/run.sh"
        api: "/invoicing/admin/init"
```

Appendix B: Scaffold Map

A scaffold map maps an associated scaffold to a specific runtime environment. Services are mapped to specific runtime instances. Both properties and configurations can be overridden. A remote call to a runtime application manager component may be executed through ssh, API call (e.g., if the application manager is run from the cloud), etc. The password "pwd" may be optional depending, e.g., depending on the ssh or other setup.

An example scaffold map is as follows:

```
version: "1.0.0"
info:
    name: "Production environment for Receive invoice" # same name
      wm.io project
    model: int-scaffold-map
    type: "project" # webMethods wm.io project
    description: "example mapping for Integration to be deployed to
      prod"
    tags:
      demo
      coucou
runtime-services:
runtime: "front-office"
    service:
        name: "receiveInvoice"
        properties:
            config:
    service:
        name: "sendInvoice"
        properties:
            config:
runtime: "back-office"
    service:
        name: "payInvoice"
        properties:
            config:
runtime-agents:
    agent: "front-office"
        type: "webMethods"
    host: "192.168.0.5"
    credentials:
        id: username@softwareag.com
    pwd: ******
    agent: back-office"
        type: "webMethods"
        endpoint:
            host-name: "192.34.33.33"
            port: 8080
        credentials:
            id: "username"
```

Appendix C: Agent Manifest Definition

An agent manifest is, for example, a subset of a scaffold aimed at configuring a specific runtime instance. An example agent manifest is as follows:

```
version: "1.0.0"
info:
    model: agent-manifest
    tags:
        demo
        coucou
repositories:
    repository:
        name: "customPackages1"
        url: "https:[//]github.com/testcustomer/wm[.]git"
    repository:
        name: "testProject"
        url: "https:[//]github[.]com/testproject/wm[.]git"
packages:
    package:
        repo: "testProject"
        name: "CommonUtils"
        version: 1.0
    package:
        repo: "customPackages1"
        name: "InvoiceProcessing"
        version: 2.1
    package:
        repo: "customPackages1"
        name: "SupportPkg"
        version: 1.0
    package:
        repo: "SAG"
        name: "WmSAP"
        version: 10.3
config:
    jdbcConnection:
        name: "NeedfulConnection"
        url: {?CONNECTION_1_URL}
        username: {?CONNECTION_1_USERNAME}
        password: {?CONNECTION_1_PW}
lib:
    file:
        repo: "customPackages1"
        source: "./library/resources/mysql-connector-java-5.1.47.jar"
        target: "/IntegrationServer/lib/jars"
    file:
        repo: "customPackages1"
        source: "./library/resources/sapjco3.jar"
        target: "/IntegrationServer/lib/jars"
actions:
    cmd: " "
    api: " "
```

What is claimed is:

1. A method of enabling an application for execution in a heterogeneous computing environment, the heterogeneous computing environment including different runtime environments distributed across at least one on-premise server and at least one Software-as-a-Service (SaaS) provider such that the at least one on-premise server is configured to provide at least one first service of the application and the at least one SaaS provider is configured to provide at least one second service of the application, the method comprising:

developing a scaffold for the application, the scaffold defining a set of assets usable by the application as well as configuration details for the assets;

generating at least one scaffold map, each scaffold map specifying target servers in the heterogeneous computing environment where individual assets in the set of assets are located or where individual assets in the set of assets are to be located, wherein different scaffold maps are generated for different user-specifiable environments to which the application is deployable;

automatically and programmatically generating, via an application manager, agent manifests based on the scaffold and one or more of the at least one scaffold maps, the agent manifests being usable to configure respective target servers associated with the respective scaffold maps;

automatically and programmatically provisioning, via a package manager, the target servers of heterogeneous computing environment based on the agent manifests, the provisioning including distributing to corresponding target servers, and processing thereon, the agent manifests, wherein the processing includes rolling back the distribution responsive to an occurrence of a defined exception case; and enabling the application following successful provisioning.

2. The method of claim 1, wherein application manager instances and package manager instances are deployable to different runtimes on different target servers.

3. The method of claim 2, wherein the application manager instances are configured to assist in local scaffold creation.

4. The method of claim 2, wherein the package manager instances are configured to assist in processing local package deployments for the application.

5. The method of claim 2, wherein the method is operable in first and second modes, the first mode employing the application manager and the package manger to centrally manage deployment and configuration of the application, the second mode employing the application manager instances and the package manager instances to locally manage deployment and configuration of the application independent of the Software-as-a-Service (SaaS) provider.

6. The method of claim 1, wherein different packages are deployable to different target servers in the heterogeneous computing environment, each package having one of a plurality of different types, and further comprising enforcing rules defining where different packages can be deployed in the heterogeneous computing environment based on the types of the respective packages.

7. The method of claim 6, wherein one of the types indicates that the package(s) associated therewith are open source.

8. The method of claim 1, further comprising enabling sandboxing on a level more granular than an individual runtime.

9. The method of claim 8, wherein the sandboxing is practiced for individual packages or individual assets.

10. The method of claim 8, wherein the sandboxing is practiced for a given package based on whether the given package was provided by a public repository.

11. The method of claim 1, further comprising running the method in one of first and second modes, the first mode enabling hot deployment across platforms at a level more granular than an individual runtime and the second mode enabling cold deployment across platforms at the level more granular than an individual runtime.

12. The method of claim 1, wherein packages are distributable to multiple different runtimes with respective configurations appropriate for the different respective runtimes, rather than being deployed to a container.

13. The method of claim 1, wherein the scaffold is developed based on user-specified information received via a user interface.

14. The method of claim 1, wherein the scaffold includes data specifying a test harness, and further comprising, after the provisioning, automatically testing the application using the test harness.

15. The method of claim 1, wherein each agent manifest is associated with one target server.

16. The method of claim 1, wherein for a given target server, multiple agent manifests are generated provided that the given target server includes multiple different runtime platforms.

17. At least one non-transitory computer readable storage medium comprising code that, when executed by at least one processor, perform operations that enable an application to be executed in a heterogeneous computing environment, the heterogeneous computing environment including different runtime environments distributed across at least one on-premise server and at least one Software-as-a-Service (SaaS) provider such that the at least one on-premise server is configured to provide at least one first service of the application and the at least one SaaS provider is configured to provide at least one second service of the application, the operations comprising:

developing a scaffold for the application, the scaffold defining a set of assets usable by the application as well as configuration details for the assets;

generating at least one scaffold map, each scaffold map specifying target servers in the heterogeneous computing environment where individual assets in the set of assets are located or where individual assets in the set of assets are to be located, wherein different scaffold maps are generated for different user-specifiable environments to which the application is deployable;

automatically and programmatically generating, via an application manager, agent manifests based on the scaffold and one or more of the at least one scaffold maps, the agent manifests being usable to configure respective target servers associated with the respective scaffold maps;

automatically and programmatically provisioning, via a package manager, the target servers of heterogeneous computing environment based on the agent manifests, the provisioning including distributing to corresponding target servers, and processing thereon, the agent manifests, wherein the processing includes rolling back the distribution responsive to an occurrence of a defined exception case; and enabling the application following successful provisioning.

18. A system configured to enable an application to be executed in a heterogeneous computing environment, the heterogeneous computing environment including different runtime environments distributed across at least one on-premise server and at least one Software-as-a-Service (SaaS) provider such that the at least one on-premise server is configured to provide at least one first service of the application and the at least one SaaS provider is configured to provide at least one second service of the application, the system comprising:

at least one processor and a memory coupled thereto, the at least one processor being configured to at least:

present a user interface enabling a user to develop a scaffold for the application, the scaffold defining a set of assets usable by the application as well as configuration details for the assets;

generate at least one scaffold map, each scaffold map specifying target servers in the heterogeneous computing environment where individual assets in the set of assets are located or where individual assets in the set of assets are to be located, wherein different scaffold maps are generated for different user-specifiable environments to which the application is deployable;

cause an application manager software module to automatically and programmatically generate agent manifests based on the scaffold and one or more of the at least one scaffold maps, the agent manifests being usable to configure respective target servers associated with the respective scaffold maps;

cause a package manager software module to automatically and programmatically provision the target servers of heterogeneous computing environment based on the agent manifests, the provisioning including distributing to corresponding target servers, and processing thereon, the agent manifests, wherein the processing includes rolling back the distribution responsive to an occurrence of a defined exception case; and enable the application following successful provisioning.

19. The system of claim 18, wherein the application manager software module and the package manager software module run in the system.

20. The system of claim 18, wherein the system is operably connected to the at least one on-premise server and wherein Software-as-a-Service (SaaS) servers of the SaaS provider are parts of the system.

\* \* \* \* \*